(12) United States Patent
Nakabo et al.

(10) Patent No.: US 7,506,814 B2
(45) Date of Patent: Mar. 24, 2009

(54) CARD READER

(75) Inventors: Akinobu Nakabo, Nagoya (JP); Naoyuki Wakabayashi, Osaka (JP); Kenichi Masada, Nagoya (JP)

(73) Assignee: Hitachi-Omron Terminal Solutions, Corp., Tokyo (JP)

( * ) Notice: Subject to any disclaimer, the term of this patent is extended or adjusted under 35 U.S.C. 154(b) by 0 days.

(21) Appl. No.: 11/646,607

(22) Filed: Dec. 28, 2006

(65) Prior Publication Data

US 2007/0205282 A1   Sep. 6, 2007

(30) Foreign Application Priority Data

Mar. 2, 2006   (JP) .............................. 2006-056363

(51) Int. Cl.
    *G06K 7/08*   (2006.01)
(52) U.S. Cl. ..................................... 235/451
(58) Field of Classification Search .................. 235/451
    See application file for complete search history.

(56) References Cited

U.S. PATENT DOCUMENTS

| | | | |
|---|---|---|---|
| 6,070,802 A | 6/2000 | Yi | |
| 6,216,954 B1 * | 4/2001 | Kuwamoto et al. | 235/486 |
| 6,474,550 B1 | 11/2002 | Caridas | |
| 6,527,187 B1 | 3/2003 | Nagata et al. | |

| | | | |
|---|---|---|---|
| 2003/0036425 A1 * | 2/2003 | Kaminkow et al. | 463/25 |

FOREIGN PATENT DOCUMENTS

| | | |
|---|---|---|
| EP | 0 458 421 | 11/1991 |
| EP | 0 945 826 | 9/1999 |
| JP | 3027954 | 6/1996 |
| JP | 3644834 | 6/1996 |
| JP | 2000-200326 A | 7/2000 |
| WO | WO 01/24169 | 4/2001 |

OTHER PUBLICATIONS

Office Action issued May 29, 2007 in European application No. 06025618.

* cited by examiner

*Primary Examiner*—Daniel Walsh
*Assistant Examiner*—Tae W Kim
(74) *Attorney, Agent, or Firm*—McDermott Will & Emery LLP

(57) ABSTRACT

A card reader which makes it possible to read card data from a non-contact IC card, discharge a foreign substance inserted from a card insertion slit, sufficiently ensure the degree of freedom in design, and sufficiently prevent the size of the apparatus main body from becoming large. A coil-shaped circuit pattern is formed on an antenna substrate used as an antenna for radio communication with a non-contact IC card. A part located inside the coil-shaped circuit pattern is cut out to form an opening. Even if the antenna substrate is disposed below the card reader main body, therefore, a foreign substance such as a coin inserted from an insertion slit may be discharged from the opening of the antenna substrate.

6 Claims, 5 Drawing Sheets

CARD READER

BACKGROUND OF THE INVENTION

The present invention relates to a card reader which conducts reading and writing on card data stored on a card. In particular, the present invention relates to a card reader on a non-contact IC card having a radio communication function.

Conventionally, card readers which conduct reading and writing on card data stored on cards are used in various apparatuses such as ATMs and CDs. As for the cards, there are magnetic cards which store card data as magnetic data and IC cards which store card data in an IC memory. As for the IC cards, there are contact IC cards having contact terminals formed on the surface of the card to make electrical contact with a card reader and non-contact IC cards having a radio communication function. In the case of magnetic cards, a magnetic head is brought into contact with a magnetic stripe formed on the surface of the magnetic card to conduct reading and writing on the card data, as known. In the case of contact IC cards, IC contacts are brought into contact with contact terminals of the contact IC card to read and write card data. In the case of non-contact IC cards, reading and writing are conducted on the card reader by radio communication with the non-conduct IC card.

A composite card obtained by compounding at least two from among the magnetic card, the contact IC card, and the non-contact IC card is already put to practical use.

If a foreign substance such as a coin is inserted from an insertion slit to insert a card and the foreign substance stays in an insertion path for a card, then a card inserted by the next user might be broken or a failure might be caused in the card reader main body. In conventional card readers, therefore, a configuration which prevents a foreign substance such as a coin inserted from the insertion slit from staying in the transportation path for card is adopted (see, for example, JP3027954 Z and JP3644834 B). Specifically, an opening or aperture is formed on the bottom side of the card insertion path. If a foreign substance is inserted from the insertion slit, therefore, the foreign substance falls from the opening and discharged from the card insertion path.

SUMMARY OF THE INVENTION

For conducting card data reading and writing on a non-contact IC card, however, an antenna used to conduct radio communication with the non-contact IC card must be provided. In typical card readers put to practical use, an antenna used to conduct radio communication with a non-contact IC card is formed of a circuit substrate (antenna substrate) having a coil-shaped circuit pattern formed thereon. In order to conduct stable radio communication between the antenna substrate and the non-contact IC card set in a communication position in the card reader, an antenna coil (coil-shaped circuit pattern) formed on the non-contact IC card set in the communication position and an antenna coil (the coil-shaped circuit pattern) formed on the antenna substrate must be attached in nearly opposed positions. In other words, in the card reader provided to read card data from the non-contact IC card, the antenna substrate must be disposed on a side opposed to the non-contact IC card set in the communication position in the card reader. If the antenna substrate is disposed below the card reader, therefore, a foreign substance is caught by the antenna substrate and it becomes impossible to discharge the foreign substance from the insertion path. Accordingly, it is also conceivable to adopt a configuration in which the antenna substrate is disposed above the card reader. If the disposition of the antenna substrate is restricted to above the card reader main body, however, the degree of freedom in the design of the card reader main body and a device (such as an ATM or a CD) incorporating the card reader falls. This poses a problem that the apparatus main body becomes large in size and the cost increases.

Furthermore, in the card reader capable of conducting card data reading and writing on the non-contact IC card and the contact IC card, it is necessary to bring IC contacts into contact with contact terminals formed on the surface of the contact IC card which is set in the communication position. Therefore, it is difficult to dispose the IC contacts on the same side as the antenna substrate with respect to the card set in the communication position. In other words, when disposing the antenna substrate and the IC contacts on the same side in the card reader main body, design must be conducted so as to make it possible to connect the IC contacts to the contact terminals formed on the surface of the contact IC card without being obstructed by the antenna substrate.

Furthermore, it is also conceivable to dispose the antenna substrate and the IC contacts so as to make them opposed to each other with the card disposed in the card data communication position between. In this case as well, however, the antenna substrate is disposed above the card reader main body and the IC contacts are disposed below the card reader main body. In the typical contact IC card, the contact terminals are formed on the card surface. When using the contact IC card, therefore, the user must insert the contact IC card into the card reader with the card surface having contact terminals formed thereon directed downward. Therefore, the user might insert a contact IC card with a mistaken direction of the contact IC card, i.e., with the surface having the contact terminals formed thereon directed upward. As a result, the occurrence frequency of insertion mistake increases, resulting in a problem of lowered operability.

An object of the present invention is to provide a card reader which makes it possible to conduct card data reading and writing on the non-contact IC card, discharge a substance inserted from the card insertion slit, sufficiently ensure the degree of freedom in design, and sufficiently suppress the size increase of the apparatus main body and the cost increase of the apparatus main body.

Another object of the present invention is to provide a card reader capable of conducting card data reading and writing on the non-conduct IC card and the contact IC card without lowering the operability.

In order to achieve the objects, a card reader according to the present invention has a configuration described hereafter.

(1) A card reader which conducts reading and writing on a non-contact IC card having a radio communication function, by means of radio communication with the non-contact IC card, the card reader including:

a frame member having an insertion path to guide the non-contact IC card inserted into a main body to a card data reading position; and an antenna substrate having a coil-shaped circuit pattern formed thereon to function as an antenna, the antenna substrate being attached to the frame member so as to cause the coil-shaped circuit pattern to be opposed to the non-contact IC card set in the card data reading position, wherein the antenna substrate has an opening inside the coil-shaped circuit pattern.

In this configuration, an antenna substrate on which an antenna to be used for radio communication with a non-contact IC card is formed has an opening inside a coil-shaped circuit pattern. Even if the antenna substrate is disposed below the card reader main body so as to be opposed to the non-contact IC card set in the communication position, therefore, a foreign substance (such as a coin) inserted from an insertion slit may be discharged from the opening of the antenna substrate. Therefore, the antenna substrate may be disposed above or below the card reader main body arbitrarily. Accordingly, the degree of freedom in design of the card reader main body may be ensured sufficiently. As a result, the apparatus main body may be sufficiently prevented from becoming large in size.

(2) A card reader including a first card data reader-writer which conducts reading and writing on a non-contact IC card having a radio communication function, by means of radio communication with the non-contact IC card, and a second card data reader-writer having IC contacts connected to contact terminals formed on a surface of a contact IC card to conduct reading or writing on the contact IC card, the card reader including:

a frame member having an insertion path to guide the non-contact IC card inserted into a main body to a card data reading position; and an antenna substrate having a coil-shaped circuit pattern formed thereon to function as an antenna, the antenna substrate being attached to the frame member so as to cause the coil-shaped circuit pattern to be opposed to the non-contact IC card set in the card data reading position, wherein the antenna substrate has an opening inside the coil-shaped circuit pattern, and the IC contacts are attached in a position opposite to the antenna substrate with the non-contact IC card or the contact IC card set in the reading position between.

In this configuration as well, the antenna substrate may be disposed above or below the card reader main body arbitrarily in the same way as (1) described above. Accordingly, the degree of freedom in design of the card reader main body may be ensured sufficiently. As a result, the apparatus main body may be sufficiently prevented from becoming large in size.

In addition, the IC contacts may be disposed above the card reader main body and the antenna substrate may be disposed below the card reader main body. As a result, the increase of the occurrence frequency of insertion mistakes of the contact IC card is held down, and the operability is not lowered.

(3) The card reader includes insertion and attachment parts to insert the antenna substrate into the main body and attach the antenna substrate to the main body.

In this configuration, the antenna substrate is attached to the main body easily. As a result, the time and labor required to assemble the card reader 1 main body may be reduced and the cost for the apparatus main body may be reduced.

According to the present invent, the antenna substrate may be disposed above or below the card reader main body arbitrarily. Accordingly, the degree of freedom in design of the card reader main body may be ensured sufficiently. As a result, the apparatus main body may be sufficiently prevented from becoming large in size and from increasing in cost.

In addition, the IC contacts may be disposed above the card reader main body and the antenna substrate may be disposed below the card reader main body. As a result, the increase of the occurrence frequency of insertion mistakes of the contact IC card is held down, and the operability is not lowered.

Other objects, features and advantages of the invention will become apparent from the following description of the embodiments of the invention taken in conjunction with the accompanying drawings.

DESCRIPTION OF THE EMBODIMENTS

Hereafter, a card reader which is an embodiment of the present invention will be described.

Figure 1:
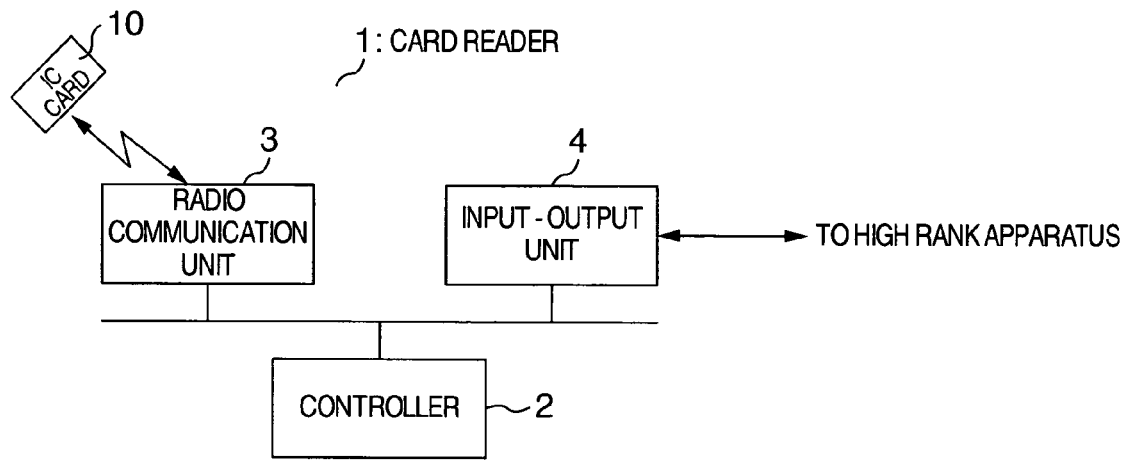
FIG. 1 is a block diagram showing a principal part of a card reader.

FIG. 1 is a block diagram showing a configuration of a principal part of a card reader which is an embodiment of the present invention. A card reader 1 shown in FIG. 1 is a card reader which has a function of conducting card data reading and writing on a non-contact IC card 10 and which does not have a function of conducting card data reading and writing on a magnetic card and a contact IC card. The card reader 1 in this embodiment includes a controller 2 for controlling operation of the apparatus main body, a radio communication unit 3 for conducting radio communication with the non-contact IC card 10, and an input-output unit 4 for outputting card data read from the non-contact IC card 10 to a high rank apparatus (such as an ATM, a CD, or a POS terminal) which is not illustrated. The card reader in this embodiment is incorporated in an apparatus such as an ATM or a CD, or connected to an apparatus such as a POS terminal via a communication line, and used. A radio communication area of the radio communication unit 3 is a range of several cm (a range of 2 to 3 cm) from an antenna. The radio communication unit 3 may conduct radio communication with the non-contact IC card 10 located in the radio communication area. This antenna is formed of a coil-shaped circuit pattern 31 formed on an antenna substrate 22 which will be described later. Furthermore, the radio communication unit 3 conducts radio communication with the non-contact IC card 10, and thereby conducts reading (transmission order) of card data stored in the non-contact IC card 10 and writing (rewriting order) of the card data. The input-output unit 4 has not only a function of outputting card data read from the non-contact IC card 10 to the high rank apparatus, but also a function of receiving card data for rewriting and so on sent from the high rank apparatus as a processing result.

Figure 2A:
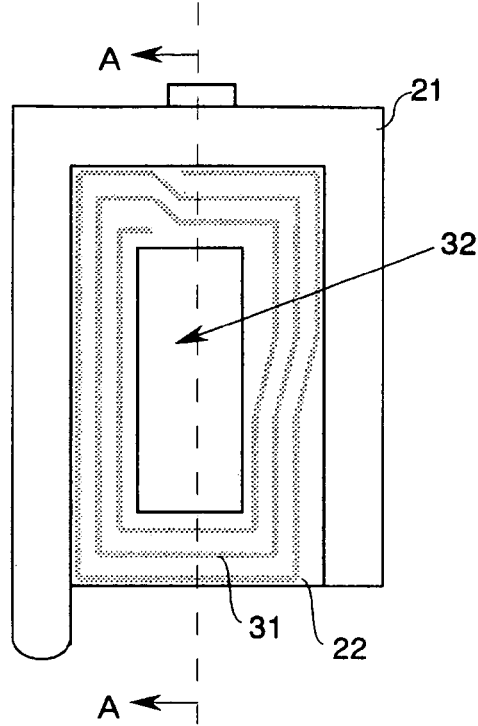
FIGS. 2A-2D are schematic diagrams showing an internal structure of a card reader.
Figure 2D:
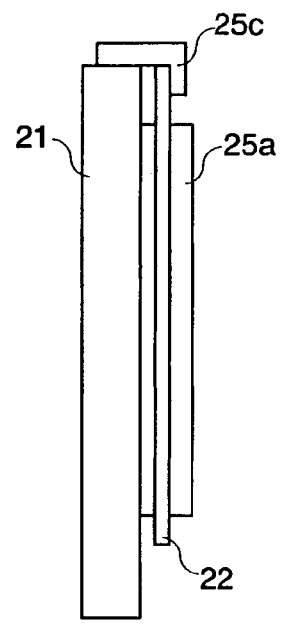
Figure 2B:
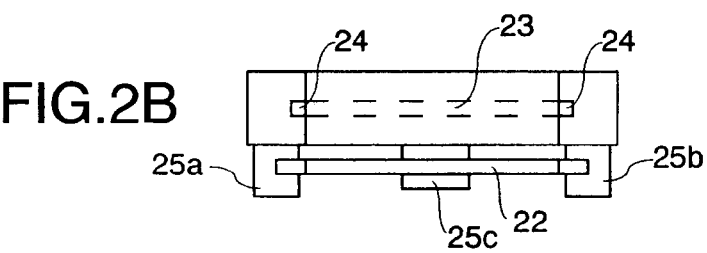
Figure 2C:
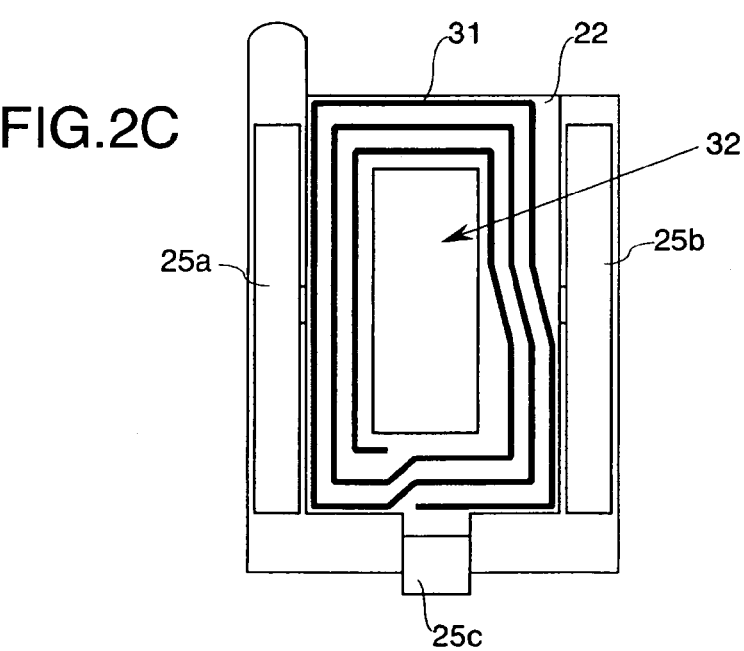

FIGS. 2A to 2D are schematic diagrams showing an internal structure of a card reader in this embodiment. FIG. 2A is a top view. FIG. 2B is a front view. FIG. 2C is a bottom view. FIG. 2D is a sectional view taken along a direction A-A in FIG. 2A. The card reader 1 in this embodiment includes a frame 21 which nearly takes the shape of "Π" and an antenna substrate 22 inserted into the frame 21. An opening formed in the frame 21 which nearly takes the shape of "Π" is an insertion slit 23 of the non-contact IC card 10. On insides of both sides of the frame 21, guide grooves 24 are formed to guide the non-contact IC card 10 inserted from the insertion slit 23 to a reading-writing position (communication position). The width of the guide grooves 24 is slightly larger than the thickness of the non-contact IC card 10. In the frame 21, a face opposite to the insertion slit 23 functions as a stopper for the non-contact IC card 10 which is inserted from the insertion slit 23 and which arrives at the reading-writing position. The reading-writing position is a position in which the tip of the non-contact IC card 10 inserted from the insertion slit 23 strikes against the face opposite to the insertion slit 23 of the frame 21. A path between the insertion slit 23 and the reading-writing position is the transportation path for the card. In addition, holding parts 25 (25*a*, 25*b* and 25*c*) for holding the inserted antenna substrate 22 is provided on a bottom face of the frame 21 as shown in FIG. 2C.

Figure 3:
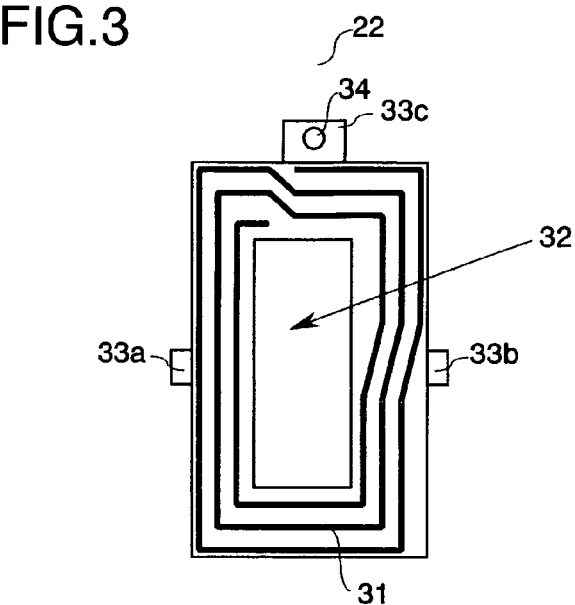
FIG. 3 is a diagram showing an antenna substrate in a card reader.

The antenna substrate 22 will now be described with reference to FIG. 3. FIG. 3 is a plan view showing the antenna substrate. The antenna substrate 22 has an external shape which is nearly rectangular. The antenna substrate 22 has a coil-shaped circuit pattern 31 formed thereon. The coil-shaped circuit pattern 31 functions as an antenna in radio communication with the non-contact IC card 10. From the aspect of the stability of the radio communication with the non-contact IC card 10, it is desirable that the circuit pattern 31 has substantially the same shape as that of an antenna coil formed on the non-contact IC card 10. Herein, therefore, the circuit pattern 31 has a rectangular shape shown in FIG. 3. However, the circuit pattern 31 may have a different shape such as an elliptical shape, as long as the stability of the radio communication with the non-contact IC card 10 is ensured.

As for the antenna substrate 22, a part located inside the circuit pattern 31 is cut out, and the part (the part located inside the circuit pattern 31) is used as an opening 32. In addition, held parts 33 (33*a*, 33*b* and 33*c*) are formed on both sides and a back part of the antenna substrate 22 so as to be held by the holding parts 25 (25*a*, 25*b* and 25*c*) of the frame 21. Grooves in which the held parts 33*a* and 33*b* formed on both sides of the antenna substrate 22 are to be inserted are formed on side faces of the holding parts 25*a* and 25*b* provided on both sides of the frame 21. The antenna substrate 22 having the held parts 33*a* and 33*b* inserted in the grooves of the holding parts 25*a* and 25*b* is slid along the grooves in a direction coupling the insertion slit 23 and the reading-writing position of the non-contact IC card 10. The holding part 25*c* is a member having a section which substantially takes the shape of "L." The holding part 25*c* has a projection (not illustrated) which engages with a hole 34 formed in the held part 33*c* of the antenna substrate 22. If the held parts 33*a* and 33*b* are inserted into the grooves of the holding parts 25*a* and 25*b* and the antenna substrate 22 is pressed in the reading-writing position direction of the non-contact IC card 10, then the held part 33*c* gets in on the top of the holding part 25*c*, and the projection formed on the holding part 25*c* engages with the hole 34. This state is a state (inserted and attached state) in which the antenna substrate 22 is inserted into and attached to the frame 21. At the time of this inserted and attached state, the antenna substrate 22 is pressed to the card reader 1 main body side (the frame 21 side) by the holding part 25*c*. Furthermore, at the time of this inserted and attached state, the circuit pattern 31 formed on the antenna substrate 22 is located in a place opposite to the antenna coil (not illustrated) formed on the non-contact IC card 10 which is set in the reading-writing position.

In this way, the antenna substrate 22 may be inserted into and attached to the card reader 1 main body easily. As a result, the time and labor required to assemble the card reader 1 main body may be reduced. The antenna substrate 22 may be removed from the card reader 1 main body by pulling the holding part 25*c* in a direction to cause it to go away from the card reader 1 main body, canceling the engaging state between the holding part 25*c* and the held part 33*c*, and pulling out in this state the antenna substrate 22 to the insertion slit 23 side.

The antenna substrate 22 has the opening 32 in the part located inside the coil-shaped circuit pattern 31. Even if a foreign substance such as a coin is inserted from the insertion slit 23 of the card reader 1, therefore, the foreign substance may be discharged from the opening 32 of the antenna substrate 22. Therefore, the foreign substance such as a coin inserted from the insertion slit 23 does not stay in the insertion path, and it is possible to prevent the foreign substance from causing a failure in the apparatus main body.

A circuit substrate having circuits included in the controller 2, the radio communication unit 3 and the input-output unit 4 formed thereon should be provided in such a position that discharge of the foreign substance such as a coin inserted from the insertion slit 23 is not obstructed. As for the foreign substance, a configuration which discharges the foreign substance from the card reader 1 main body may be used, or a configuration which withdraws the foreign substance within the card reader 1 main body may be used.

In the foregoing description, the antenna substrate 22 is attached below the card reader 1 main body (below the frame 21). However, the antenna substrate 22 may be attached above the card reader 1 main body. As evident from the foregoing description, the lower side of the card reader 1 main body is opened when the antenna substrate 22 is not attached to the frame 21. Even if the antenna substrate 22 is attached above the card reader 1 main body, therefore, the foreign substance such as a coin inserted from the insertion slit 23 may be discharged. Thus, the position in which the antenna substrate 22 is attached to the card reader 1 main body is not restricted to above the card reader 1 main body in order to discharge the foreign substance such as a coin inserted from the insertion slit 23. The degree of freedom of design in the card reader 1 main body and devices such as an ATM and a CD incorporating the card reader 1 may be ensured sufficiently. The size increase or the cost increase of the main body may be suppressed.

By the way, the card reader 1 may be surrounded by a cover. Or the card reader may be incorporated into an apparatus such as an ATM or a CD without being surrounded by a cover.

Figure 4:
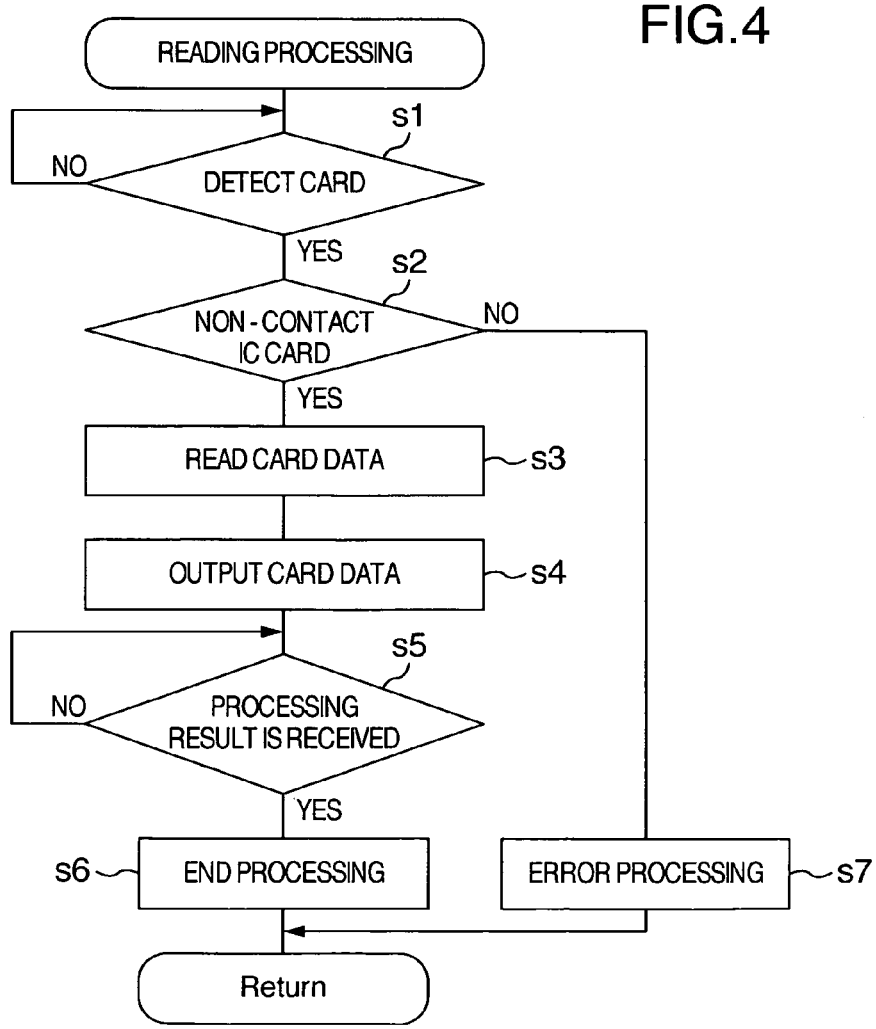
FIG. 4 is a flow chart showing card data reading processing in a card reader.
Figure 6A:
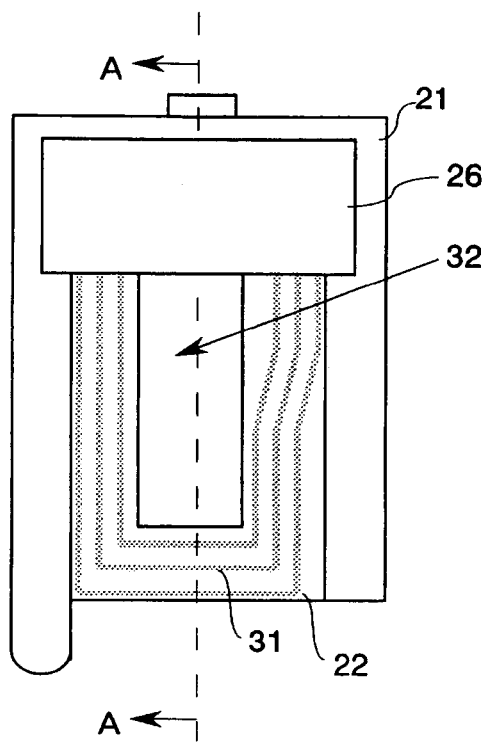
FIGS. 6A-6D are schematic diagrams showing an internal structure of a different card reader.
Figure 6D:
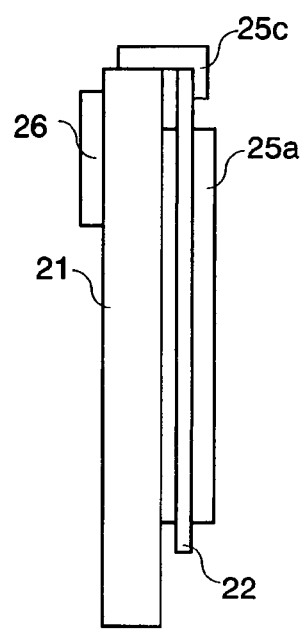
Figure 6B:
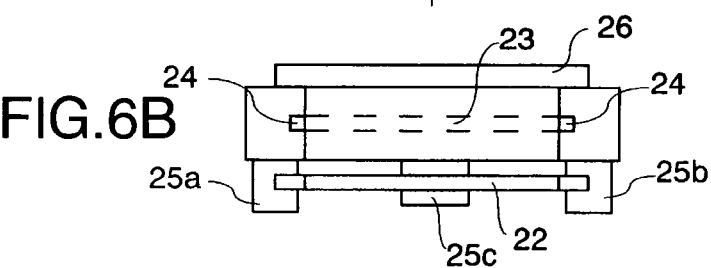
Figure 6C:
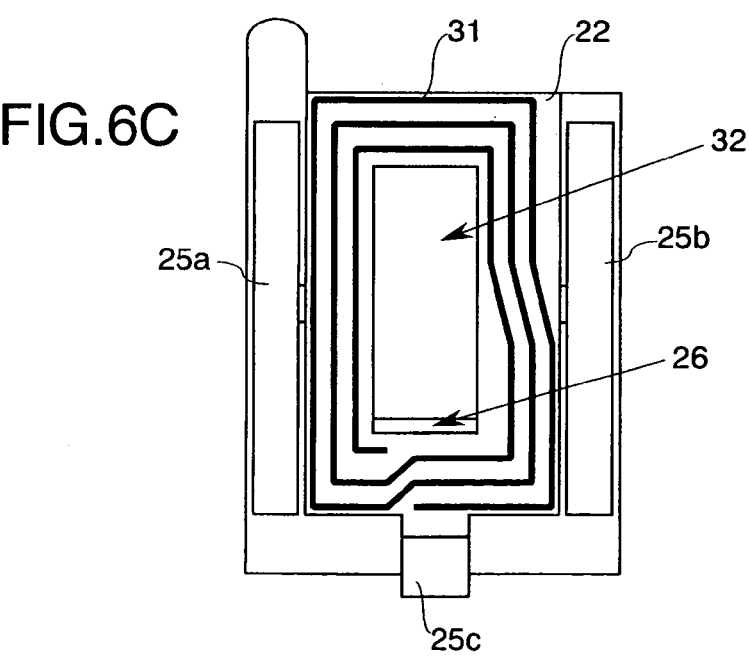

Operation of the card reader 1 in this embodiment will now be described briefly. FIG. 4 is a flow chart showing card data reading processing conducted in a card reader of this embodiment. A user who uses the card reader 1 inserts the non-contact IC card 10 into the insertion slit 23, and pushes it in the reading-writing position direction. At this time, the non-contact IC card 10 is pressed into the card reader 1 main body along the guide grooves 24. The user pushes in the non-contact IC card 10 as far as a position in which the tip of the non-contact IC card 10 strikes against a face opposed to the insertion slit 23 of the frame 21. This brings about a state in which the non-contact IC card 10 is set in the reading-writing position.

Upon detecting that the card is set in the reading-writing position (s1), the card reader 1 makes a decision whether the card is the non-contact IC card 10 (s2). At the s1, a sensor which is not illustrated detects the card which is set in the reading-writing position. In order to prevent the card from being pulled out, a lock mechanism may be provided. Upon detecting that the card is set in the reading-writing position, the lock mechanism locks the card so as to prevent the user from pulling out the card from the card reader 1 main body before the processing on this card is completed. At s2, the card reader 1 conducts polling in the radio communication unit 3 with respect to the card set in the reading-writing position, and a decision is made whether the card is the non-contact IC card 10 on the basis of whether there is an answer to the polling. Specifically, if there is an answer to the polling, the card is judged to be the non-contact IC card 10. On the contrary, if there is not an answer to the polling, the card is judged not to be the non-contact IC card 10.

Upon judging the card to be the non-contact IC card 10 at s2, the card reader 1 reads card data stored in the non-contact IC card (s3). In processing conducted at S3, a request is issued to the non-contact IC card 10 to request the non-contact IC card 10 to transmit card data stored therein, and the card data transmitted from the non-contact IC card 10 is received. The card reader 1 outputs in the input-output unit 4 the card data read from the non-contact IC card 10 to the high rank apparatus (s4).

The high rank apparatus executes the processing by using the card data output by the card reader 1, and returns a result of the processing to the card reader 1. If update of the card data stored in the non-contact IC card 10 is necessary, the high rank apparatus returns update card data besides the processing result to the card reader 1. Upon receiving in the input-output unit 1 the processing result from the high rank apparatus (s5), the card reader 1 conducts end processing (s6) and finishes the present processing. In the end processing at s6, for example, processing relating to the update of the card data on the non-contact IC card set in the reading-writing position is conducted as occasion demands. If a decision is made at s2 that the card is not the non-contact IC card 10, then the card reader 2 conducts error processing (s7) and finishes the present processing.

If pulling out of the non-contact IC card 10 set in the reading-writing position is prevented, then the prevention should be canceled when the processing conducted at s6 or s7 is completed.

Figure 5:
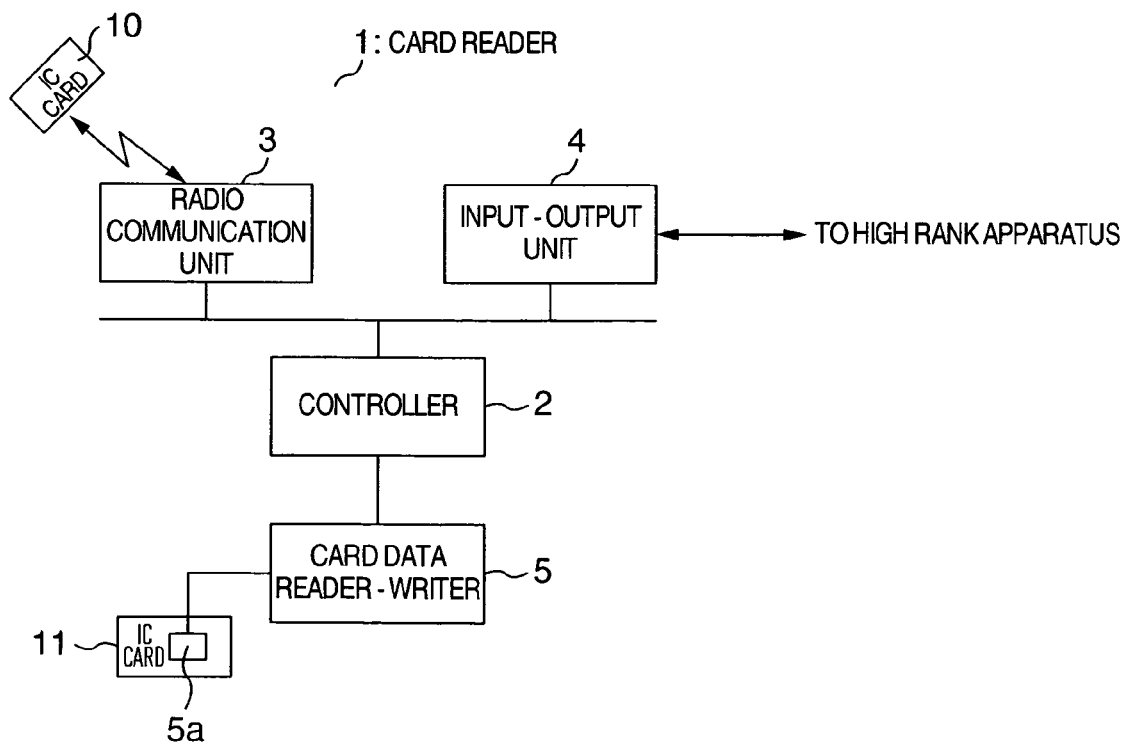
FIG. 5 is a block diagram showing a principal part of a different card reader.

A card reader according to a different embodiment of the present invention will now be described. FIG. 5 is a block diagram showing a principal part of a card reader 1 in this embodiment. In FIG. 5, the same components as those in FIG. 1 are denoted by like reference numerals. The card reader 1 in this embodiment has a configuration capable of conducting card data reading and writing on the non-contact IC card 10 and the contact IC card 11. The card reader 1 in this embodiment includes a data reader-writer 5 to conduct card data reading and writing on the contact IC card 11, in addition to the configuration shown in FIG. 1. The card data reader-writer 5 includes IC contacts 5a which are electrically connected to contact terminals formed on the surface of the contact IC card 11. The IC contacts 5a are disposed in a position electrically connected to the contact terminals of the contact IC card 11 which is set in the reading and writing position of the card data.

FIGS. 6A-6D are schematic diagrams showing an internal structure of the card reader in this embodiment. In FIGS. 6A-6D as well, the same components as those in FIGS. 2A-2D are denoted by like reference numerals. The card reader 1 in this embodiment differs from the card reader shown in FIGS. 2A-2D in that a contact substrate 26 having the IC contacts 5a is provided in a position opposed to the antenna substrate 22. The antenna substrate 22 and the contact substrate 26 are opposed to each other with a card set in the card data reading and writing position between. A circuit relating to the card data reader-writer 5 may be formed on the contact substrate 26, or may be formed on a circuit substrate on which circuits included in the controller 2, the radio communication unit 3 and the input-output unit 4 are formed. When the contact IC card 11 is set in the card data reading writing position, the contact terminals formed on the contact IC card 11 are electrically connected to the IC contacts 5a provided on the contact substrate 26.

In the case where the contact substrate 26 is disposed below the frame 21, the contact substrate 26 is disposed so as not to obstruct the discharge of a foreign substance such as a coin inserted from the insertion slit 23.

If the antenna substrate 22 is disposed below the main body, then the card reader 1 in this embodiment may thus also discharge the foreign substance inserted from the insertion slit 23, from the opening 32 of the antenna substrate 22 in the same way as the card reader in the foregoing embodiment. Even in the configuration having the antenna substrate 22 disposed above the card reader 1 main body, the foreign substance inserted from the insertion slit 23 may be discharged from the insertion path with no problems, although the area of the opening is slightly smaller because the contact substrate 26 having the IC contacts 5a is disposed.

In the card reader in this embodiment as well, the position in which the antenna substrate 22 is attached to the card reader 1 main body is not restricted to above the card reader 1 main body in order to discharge the foreign substance such as a coin inserted from the insertion slit 23. The degree of freedom of design in the card reader 1 main body and devices such as an ATM and a CD incorporating the card reader 1 may be ensured sufficiently. The size increase or the cost increase of the main body may be suppressed.

The contact substrate 26 is disposed on the card reader 1 main body. As a result, a configuration for which the user inserts the contact IC card 11 with the card surface (a face on which the contact terminals are formed) directed upward may be implemented. Therefore, the occurrence frequency of insertion mistake of the contact IC card 11 is suppressed, and lowering in operability may be prevented.

Figure 7:
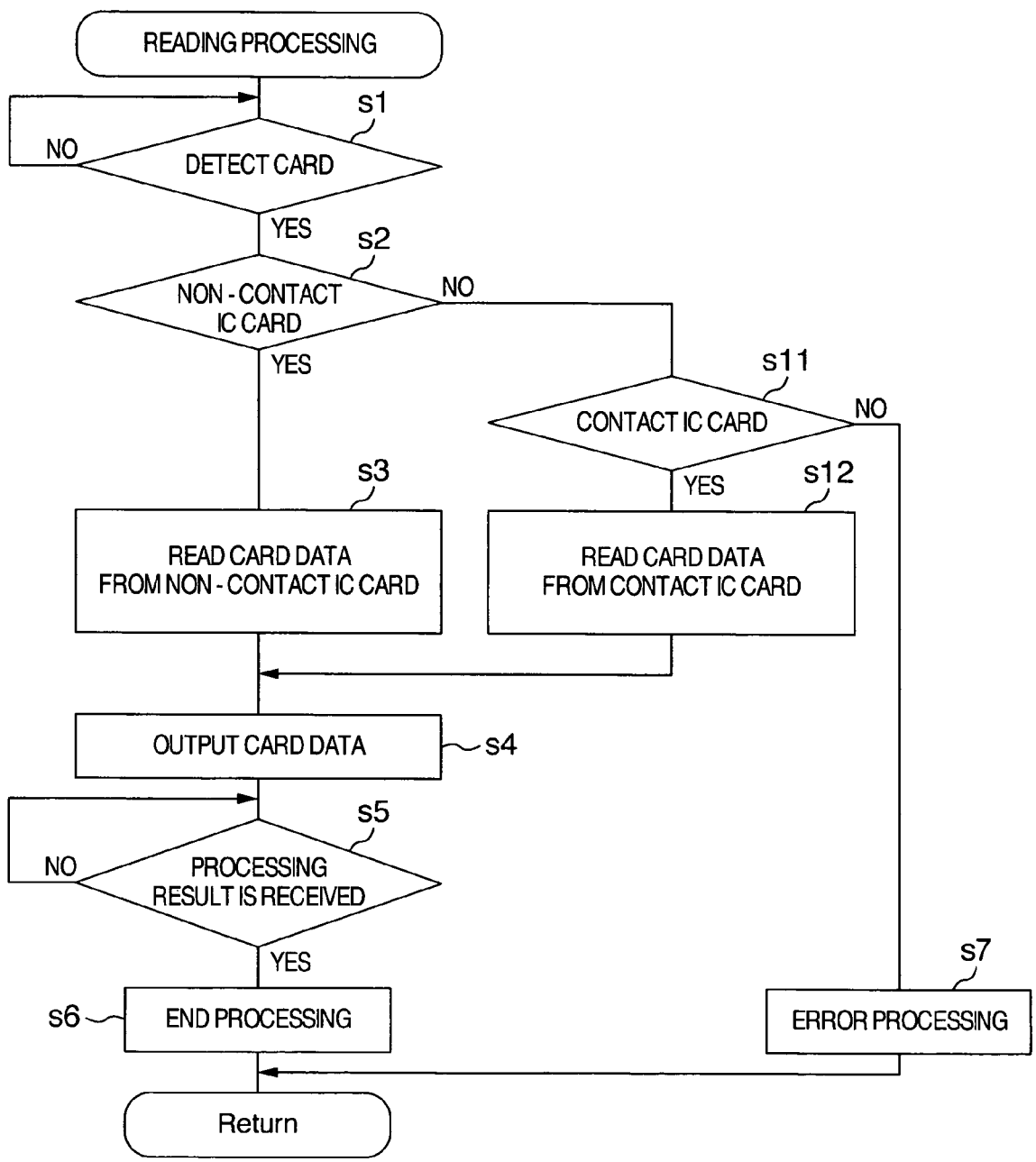
FIG. 7 is a flow chart showing card data reading processing in a different card reader.

Card data reading processing in the card reader according to this embodiment will now be described briefly. FIG. 7 is a flow chart showing reading processing for the card data. The same processing step as that in FIG. 4 is denoted by like step number (s*). Upon detecting at s1 that a card is set in the card data reading-writing position, the card reader 1 in this embodiment makes a decision at s2 whether this card is the non-contact IC card 10. Upon judging the card to be the non-contact IC card 10 at s2, the card reader 1 executes processing at s3 to s6 shown in FIG. 4. On the other hand, upon judging the card not to be the non-contact IC card 10 at s2, the card reader 1 makes a decision whether the card set in the reading-writing position of the card data is the contact IC card 11 (s11). A decision is made at s11 whether the card is the contact IC card 11 on the basis of whether the card reader is electrically connected to the card which is set in the card data reading-writing position. Upon judging the card to be the non-contact IC card at s11, the card reader 1 reads card data stored in the contact IC card 11 (s12) and executes the processing at s4 to s6 shown in FIG. 4.

Upon judging the card not to be the contact IC card 11 either at s11, the card reader 1 conducts error processing at s7 and finishes the present processing.

In this way, the card reader 1 in this embodiment may read card data stored in the non-contact IC card 10 and the contact IC card 11.

In the embodiment, the present invention is applied to the card reader for which the user inserts a card in the insertion slit 23 and pushes in the card as far as the card data reading-writing position. As a matter of course, however, the present invention may also be applied to a card reader including a transporter which transports the card inserted in the insertion slit 23 to the card data reading-writing position.

Furthermore, it is also possible to use a configuration in which a magnetic head is provided near the card insertion slit 23 and card data stored on the magnetic card may also be read.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A card reader which conducts reading and writing on a non-contact IC card having a radio communication function, by means of radio communication with the non-contact IC card, the card reader comprising:
    a frame member having an insertion path to guide the non-contact IC card inserted into a main body to a card data reading position; and
    an antenna substrate having a coil-shaped circuit pattern formed thereon to function as an antenna, the antenna substrate being attached to the frame member so as to cause the coil-shaped circuit pattern to be opposed to the non-contact IC card when set in the card data reading position,
    wherein the antenna substrate has an opening inside the coil-shaped circuit pattern, and
    wherein the antenna substrate is located or disposed underneath the non-contact IC card inserted into the card reading position; and
    a card data reader-writer disposed so as to be opposed to the antenna substrate,
    wherein the non-contact IC card or a contact IC card fits in the card data reading position between the data card reader-writer and the antenna substrate, and
    wherein the card reader-writer is disposed so as to be connected to contact terminals formed on a surface of the contact IC card.

2. The card reader according to claim 1, further comprising insertion and attachment parts to insert the antenna substrate into the main body and attach the antenna substrate to the main body.

3. The card reader according to claim 1, further comprising insertion and attachment parts to insert the antenna substrate into the main body and attach the antenna substrate to the main body.

4. The card reader according to claim 1, wherein the antenna substrate is attached below the frame member.

5. The card reader according to claim 1, wherein the coil-shaped circuit pattern takes a rectangular shape.

6. The card reader according to claim 1, wherein held parts are formed in end parts of the antenna substrate so as to be held by the frame member.

* * * * *